US008245280B2

(12) United States Patent
Song et al.

(10) Patent No.: US 8,245,280 B2
(45) Date of Patent: Aug. 14, 2012

(54) SYSTEM AND METHOD FOR USER ACCESS CONTROL TO CONTENT IN A NETWORK

(75) Inventors: Yu Song, Milpitas, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1052 days.

(21) Appl. No.: 11/056,221

(22) Filed: Feb. 11, 2005

(65) Prior Publication Data

US 2006/0184530 A1    Aug. 17, 2006

(51) Int. Cl.
G06F 15/16    (2006.01)
H04L 29/06    (2006.01)

(52) U.S. Cl. .............. 726/3; 726/2; 726/26; 726/27; 726/28; 726/29; 713/182; 713/183; 713/184; 713/185

(58) Field of Classification Search .............. 726/3
See application file for complete search history.

(56) References Cited

U.S. PATENT DOCUMENTS

| | | | |
|---|---|---|---|
| 5,315,657 A | 5/1994 | Abadi et al. | |
| 5,761,669 A | 6/1998 | Montague et al. | |
| 5,911,143 A | 6/1999 | Deinhart et al. | |
| 6,073,242 A | 6/2000 | Hardy et al. | |
| 6,202,066 B1 | 3/2001 | Barkley et al. | |
| 6,269,405 B1 | 7/2001 | Dutcher et al. | |
| 6,269,406 B1 | 7/2001 | Dutcher et al. | |
| 6,311,205 B1 | 10/2001 | Dutcher et al. | |
| 6,357,010 B1 | 3/2002 | Viets et al. | |
| 6,434,607 B1 | 8/2002 | Haverstock et al. | |
| 6,442,695 B1 | 8/2002 | Dutcher et al. | |
| 6,453,353 B1 | 9/2002 | Win et al. | |
| 6,574,736 B1 | 6/2003 | Andrews et al. | |
| 6,640,307 B2 | 10/2003 | Viets et al. | |
| 6,651,096 B1 * | 11/2003 | Gai et al. | 709/223 |
| 6,654,794 B1 | 11/2003 | French | |
| 6,665,303 B1 | 12/2003 | Saito et al. | |
| 6,920,558 B2 * | 7/2005 | Sames et al. | 713/166 |

(Continued)

FOREIGN PATENT DOCUMENTS

JP    2000-112891    4/2000

(Continued)

OTHER PUBLICATIONS

Rasheed et al., "Home Interoperability Framework for the Digital Home," Intel Techology Journal, Nov. 2002, pp. 1-16.*

(Continued)

*Primary Examiner* — Luu Pham
(74) *Attorney, Agent, or Firm* — Beyer Law Group LLP

(57) ABSTRACT

A method of unifying the different, device-specific and platform-specific access control lists (ACL) for different users and user groups in a home network. The home network has networked heterogeneous devices and hosting where a user is presented with a consistent, single view of ACL on home-wide users and user groups. Users in the home network, therefore, do not need to control ACL for device-specific users and user groups on each individual device. Instead, a user controls the home-wide ACL for home-wide users and user groups. The changes to home-wide ACL for home-wide users and user groups are propagated to individual devices. Further, changes on individual devices can be made to device-specific ACL for device-specific users and user groups. Such changes are subsequently propagated to the home-wide ACL for home-wide users and user groups.

23 Claims, 7 Drawing Sheets

U.S. PATENT DOCUMENTS

| | | |
|---|---|---|
| 6,948,076 B2 | 9/2005 | Saito |
| 6,970,127 B2 | 11/2005 | Rakib |
| 7,081,830 B2 | 7/2006 | Shimba et al. |
| 7,225,263 B1* | 5/2007 | Clymer et al. ............... 709/229 |
| 7,316,027 B2 | 1/2008 | Burch et al. |
| 7,325,057 B2 | 1/2008 | Cho et al. |
| 7,424,475 B2 | 9/2008 | Ishii et al. |
| 7,437,755 B2 | 10/2008 | Farino et al. |
| 7,530,112 B2* | 5/2009 | Smith ............................ 726/28 |
| 7,657,748 B2 | 2/2010 | Gentry |
| 7,688,791 B2 | 3/2010 | Fujita |
| 7,715,412 B2 | 5/2010 | Afshar et al. |
| 2001/0033554 A1 | 10/2001 | Ayyagari |
| 2001/0045983 A1* | 11/2001 | Okazaki et al. ............... 348/211 |
| 2002/0078161 A1 | 6/2002 | Cheng |
| 2002/0103850 A1 | 8/2002 | Moyer |
| 2002/0112045 A1* | 8/2002 | Nirkhe et al. ................. 709/223 |
| 2002/0112186 A1* | 8/2002 | Ford et al. ..................... 713/201 |
| 2003/0088786 A1* | 5/2003 | Moran et al. .................. 713/201 |
| 2003/0163701 A1 | 8/2003 | Ochi et al. |
| 2003/0221011 A1* | 11/2003 | Shitano ......................... 709/229 |
| 2004/0030702 A1* | 2/2004 | Houston et al. ................. 707/10 |
| 2004/0059924 A1 | 3/2004 | Soto et al. |
| 2004/0125402 A1* | 7/2004 | Kanai et al. .................. 358/1.15 |
| 2004/0172396 A1* | 9/2004 | Vanska et al. ..................... 707/9 |
| 2004/0205172 A1 | 10/2004 | Kim |
| 2004/0242209 A1 | 12/2004 | Kruis et al. |
| 2004/0249768 A1* | 12/2004 | Kontio et al. .................... 705/65 |
| 2004/0254934 A1* | 12/2004 | Ho et al. ............................ 707/9 |
| 2005/0066024 A1 | 3/2005 | Crocitti et al. |
| 2005/0086491 A1* | 4/2005 | Haugh et al. .................. 713/182 |
| 2005/0097441 A1* | 5/2005 | Herbach et al. ............ 715/501.1 |
| 2005/0099982 A1 | 5/2005 | Sohn et al. |
| 2005/0108556 A1* | 5/2005 | DeMello et al. .............. 713/189 |
| 2005/0144481 A1* | 6/2005 | Hopen et al. .................. 713/201 |
| 2005/0278334 A1* | 12/2005 | Fey et al. ........................... 707/9 |
| 2005/0286722 A1 | 12/2005 | Aboba et al. |
| 2006/0045267 A1 | 3/2006 | Moore et al. |
| 2006/0080534 A1 | 4/2006 | Yeap et al. |
| 2006/0117058 A1* | 6/2006 | Smith ............................ 707/102 |
| 2006/0123005 A1 | 6/2006 | Burnett et al. |
| 2006/0143295 A1 | 6/2006 | Costa-Requena et al. |
| 2006/0153072 A1 | 7/2006 | Bushmitch et al. |
| 2006/0177066 A1 | 8/2006 | Han et al. |
| 2006/0182045 A1 | 8/2006 | Anderson |
| 2006/0195893 A1 | 8/2006 | Caceres et al. |
| 2006/0242254 A1* | 10/2006 | Okazaki et al. ............... 709/208 |
| 2007/0022479 A1 | 1/2007 | Sikdar et al. |
| 2007/0214241 A1 | 9/2007 | Song et al. |
| 2007/0214356 A1 | 9/2007 | Song et al. |
| 2007/0288487 A1 | 12/2007 | Song et al. |
| 2007/0288632 A1 | 12/2007 | Kanaparti et al. |
| 2008/0294559 A1 | 11/2008 | Wield et al. |

FOREIGN PATENT DOCUMENTS

| | | |
|---|---|---|
| JP | 2002-540739 | 11/2002 |
| JP | 2004-094401 | 3/2004 |
| WO | 2004079594 | 9/2004 |

OTHER PUBLICATIONS

Mizuno et al., "A New Remote Configurable Firewall System for Home-use Gateways," IEEE, 2004, p. 599-601.*

Jeong, J. et al., "A XML-Based Single Sign-on Scheme Supporting Mobile and Home Network Service Environments," IEEE Transactions on Consumer Electronics, Nov. 2004, pp. 1081-1086, vol. 50, No. 4, IEEE Service Center, New York, NY.

Arnold, J. et al., "Single Sign On-Funktionalitat in dezentralen Umgebungen," IP.com Journal, Jul. 23, 2003, p. 97, West Henrietta, NY.

Jeong, J. et al., "An XML-Based Single Sign-on Scheme Supporting OSGi Framework," Consumer Electronics, 2005, pp. 31-32, 2005 Digest of Technical Papers.

U.S. Appl. No. 11/056,219, filed Feb. 11, 2005, Y. Song et al.

SyncML—*Sync Protocol*, Version 1.0, http://www.syncml.org/docs/syncml_protocol_v10_20001207.pdf. pp. 1-60, Dec. 7, 2000.

*Open Digital Rights Language (ODRL) Version 1.1*, W3C Note, Sep. 19, 2002, http://www.w3.org/TR/2002/NOTE-odrl-20020919/.

Greenwald, S.J. et al., "A New Security Policy for Distributed Resource Management and Access Control," ACM Special Interest Group on Security, Audit, and Control, 1996, pp. 74-86, ACM, New York, NY.

Wang, O. et al., "An Inter-application and Inter-client Priority-based OoS Proxy Architecture for Heterogeneous Networks," Proceedings of the 10th IEEE Symposium on Computer and Communications ISCC, Jun. 2005, pp. 819-824, IEEE Publishing, New York, NY, United States.

Notification of Transmittal of the International Search Report and the Written Opinion of the International Searching Authority; PCT/KR2007/002766, dated Sep. 12, 2007, Korean Intellectual Property Office, Republic of Korea.

Notification of Transmittal of the International Search Report and the Written Opinion of the International Searching Authority; PCT/KR2007/002772, dated Sep. 18, 2007, Korean Intellectual Property Office, Republic of Korea.

U.S. Non-Final Office Action for U.S. Appl. No. 11/809,016 mailed Jun. 25, 2009.

U.S. Non-Final Office Action for U.S. Appl. No. 11/809,016 mailed Jan. 4, 2010.

U.S. Non-Final Office Action for U.S. Appl. No. 11/810,009 mailed Jul. 8, 2009.

U.S. Non-Final Office Action for U.S. Appl. No. 11/809,016 mailed Jul. 13, 2010.

U.S. Final Office Action for U.S. Appl. No. 11/810,009 mailed Feb. 1, 2010.

U.S. Notice of Allowance for U.S. Appl. No. 11/810,009 mailed Jun. 24, 2010.

U.S. Non-Final Office Action for U.S. Appl. No. 11/713,522 mailed Apr. 27, 2010.

U.S. Supplemental Notice of Allowability for U.S. Appl. No. 11/810,009 mailed Jul. 28, 2010.

U.S. Final Office Action for U.S. Appl. No. 11/713,522 mailed Oct. 6, 2010.

Office Action in U.S. Appl. No. 11/809,016, dated Nov. 12, 2010.

Foreign office action from JP patent application No. 2006-028783, dated Sep. 6, 2011, English translation included, 5 pages.

Korean Office Action dated Nov. 23, 2006 for Korean Patent Application No. 10-2005-0112000.

Korean Office Action dated Jun. 27, 2007 for Korean Patent Application No. 10-2005-0112000.

* cited by examiner

SYSTEM AND METHOD FOR USER ACCESS CONTROL TO CONTENT IN A NETWORK

FIELD OF THE INVENTION

The present invention relates generally to user access control to devices in a network, and more particularly, to user access control to content/resources in a network of devices such as a home network.

BACKGROUND OF THE INVENTION

In heterogeneously networked computer networks, each device in the network may have its own authorized users/user groups. Each user or user group may have device-specific access rights on the device. Conventional user access methods provide a centralized server that is used first to establish users and user groups and then communicate with other devices to establish native user and users groups on other devices. As a result, the central server maintains a map of users and user groups on different devices. When a user on a device wishes to access another device, the centralized server translates the user on the first device to another user on the second device such that the access rights on the second device can be verified and resources can be accessed or denied.

Such conventional role-based access control systems and methods utilize a centralized user profile registry to control computing resources that a user is permitted to access. When a user requests to access certain resources, the request, along with the user, is first routed to the user registry. The user registry contains a user profile database and is able to retrieve user profile and user-specific access control list (ACL) policies. The user registry verifies user permission on the request based on user profile and user-specific ACL policies. Only when the request matches the user's ACL policy, the permission is granted.

One of the disadvantages of such conventional centralized user management is that the central server presents a single point of failure where the server fails, it brings down the entire security control system. Another disadvantage of such a conventional approach is that it assumes devices in a network are homogeneous in their access control policies (e.g., a user can be uniformly recognized on devices in the network), and there is only one security system in the network. Therefore, in such a conventional approach, user management in networked heterogeneous devices requires that a centralized server must be presented and user and user groups must be established first before any other devices can be added to the network. Such an approach is deficient in a home environment where the network is not pre-planned, and devices can be added to the network in random order.

Further, in such conventional approaches, user management and their access control for devices in a home environment is problematic. Instead of a skilled, dedicated system administrator who understands the details and complexity of an enterprise network environment, it is unlikely that there will be a dedicated system administrator in a home environment. In addition, devices in a home network environment are more functionally diversified than that of an enterprise environment. As a result, the user management and access control of resource in a home network environment must unify the difference of heterogeneity of devices and must be made easy for a home usage.

BRIEF SUMMARY OF THE INVENTION

The present invention addresses the above needs. In one embodiment, the present invention provides a method in a distributed system that allows a single-view of users and user groups' ACLs on the resources (i.e., content, devices and services) in the home network environment regardless of differences in device-specific access control mechanisms, and OS-specific access control mechanisms.

As such, in one example implementation, the present invention provides a method of unifying the different, device-specific and operating system (OS)-specific access control lists (ACL) for different users and user groups in a home network. A home network according to the present invention includes networked heterogeneous devices and hosted content wherein a user is presented with a consistent, single view of ACL on home-wide users and user groups. Users in such a home network, therefore, do not need to control ACL for device-specific users and user groups on each individual device. Instead, a user controls the home-wide ACL for home-wide users and user groups. The changes to home-wide ACL for home-wide users and user groups are propagated to individual devices. In another aspect, the present invention also allows changes to device-specific ACL for device-specific users and user groups. Such changes are subsequently propagated to the home-wide ACL for home-wide users and user groups.

Therefore, the present invention allows each device to have device-specific users, user groups, and associated ACL policies. A centralized server where all users and user group profiles, and their ACL are stored, is not utilized. Instead, the present invention aggregates users and user ACLs from underlying heterogeneous devices. The aggregation makes it easy for a home user to administrate users and ACLs. The actual data, however, can be stored in actual devices in a distributed manner. In case the aggregation fails, a user is still able to manage user profiles on each individual device.

Accordingly, an improved access method according to an embodiment of the present invention, in contrast to conventional centralized user profile registry, is to annotate each resource with ACL information for each user. Therefore, no central user profile registry is needed. Instead, when a user wants to access a resource, the associated ACL information is first verified before the access is granted or denied. Establishment of a server and creation of users and user groups on that server are not required. Rather, the present invention allows creating home-wide users, user groups and their ACLs based on existing devices' user management. This provides a flexible approach in that it takes both top-down approaches and bottom-up approaches.

Other embodiments, features and advantages of the present invention will be apparent from the following specification taken in conjunction with the following drawings.

DETAILED DESCRIPTION OF THE INVENTION

Figure 1:
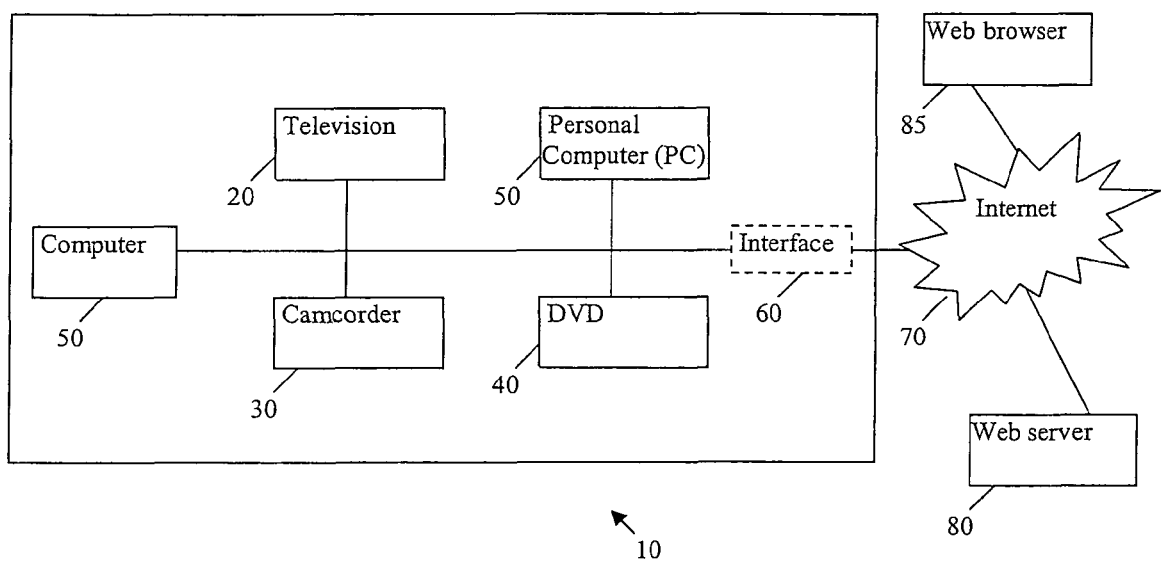
FIG. 1 shows an example functional block diagram of a network in which an embodiment of access control according to the present invention is implemented.

Referring to FIG. 1, an example network such as a home network 10 that includes multiple devices, such as TV 20, camcorder 30, DVD 40, conventional computing devices, such as PCs 50, which can be connected to the internet 70 via an optional interface 60 for communication with a web server 80 and a web browser 85.

Each device in the home network 10 has device-specific access control mechanisms. For example, security-aware UPnP devices can have UPnP-specific ACLs that control who can access functionalities that are offered by such devices. Some of these devices have storage capabilities to contain content (e.g., as a PC can store pictures, video, audio files, etc.). These devices contain operation system specific ACL policies that describe who owns the content, and how the content can be accessed (e.g., "read", "write", "execute", etc.) In addition, some devices have digital rights management (DRM) that controls how the content can be accessed and manipulated using Open Digital Rights Language (ODRL). The plurality of existing ACL policies in a home network environment presents a challenge to home users. Home network environments, unlike enterprise network environments, do not have skilled system administrators. A home network requires easy security administration with minimum skill.

Accordingly, in one embodiment the present invention provides a method in a distributed system such as the home network 10, that unifies the diversity of different ACL policies on devices and content into a consistent, single view of ACL policy. The single view of ACL policy simplifies the administration of user management and ACL policy control. The system maps this consistent, single view of user management and ACL policy to device-specific ACL policy on each device, and OS-specific ACL policies on a piece of content for device-specific users and user groups.

In one implementation, a single view ACL system is provided for multiple heterogeneous devices. Some of such devices comprise UPnP security-aware devices, while others may not be UPnP devices, but use different access protocols and have security system built into them (e.g., a PC with Windows™ operating system and distributed component object model (DCOM) access protocol).

Figure 2:
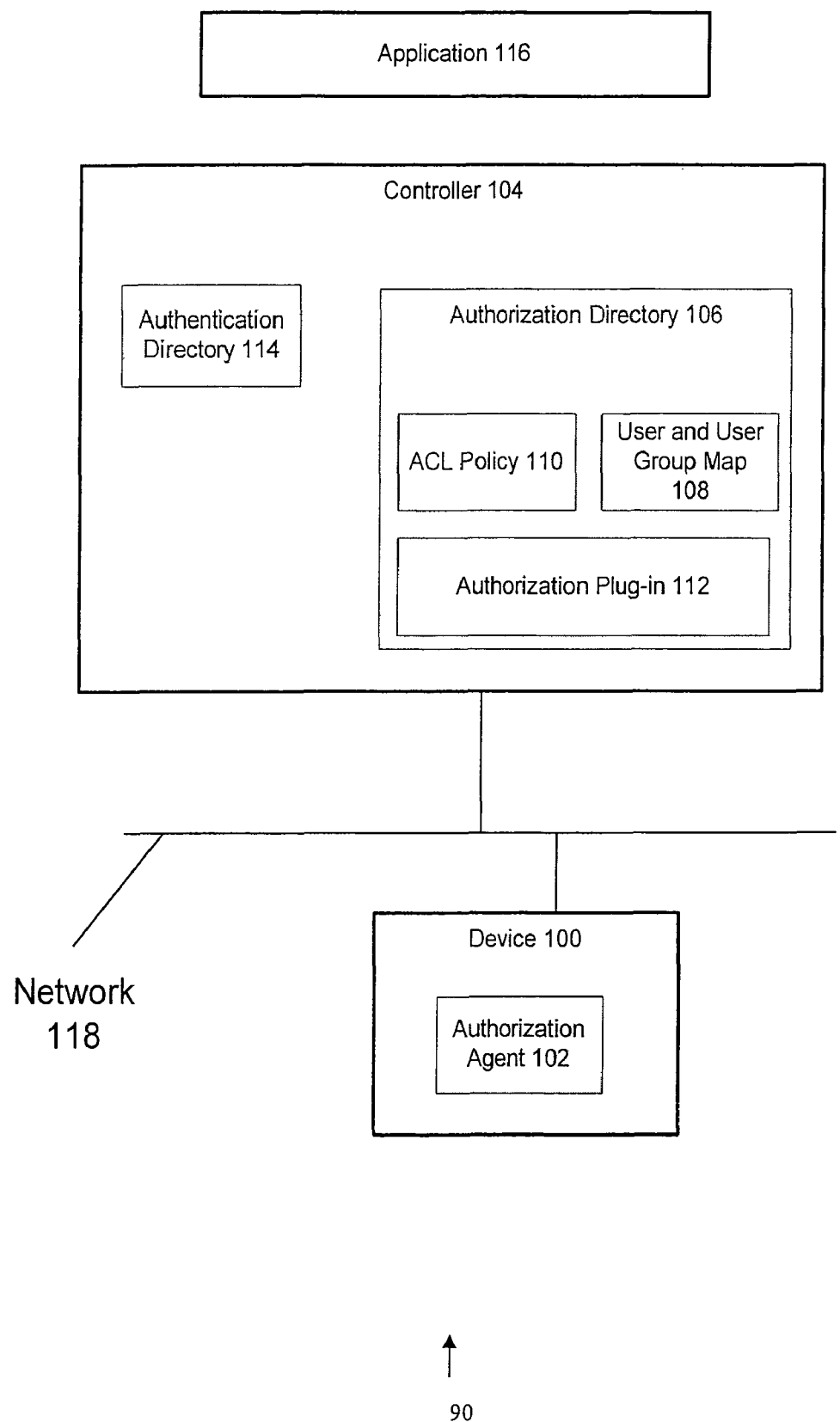
FIG. 2 shows an example functional block diagram of an access control system according to an embodiment of the present invention.

In an example shown by a functional block diagram in FIG. 2, an ACL system 90 in a home network includes: (1) a device 100 that is UPnP security-aware and includes an authorization agent 102, and (2) a controller module 104. The authorization agent 102 comprises a software module that contains a device-specific access controls including a access protocol and a device-specific ACL policy. In one example of the authorization agent 102, an UPnP security-aware device authorization agent contains a list of UPnP ACL policies that specify who can access services on devices with time constraints. In another example of the authorization agent 102, a PC authorization agent contains a list of ACL policies that specify the ownership of the content, the read and write operations on the content with PC-specific users and user groups.

The controller (software) module 104 executes on a processing device in the home network, such as an UPnP control point with security console (e.g., PC 50 of the network 10 in FIG. 1), and includes an authorization directory 106. The authorization directory 106 includes three (software) modules: (1) a user and user group map 108, (2) an ACL policy 110, and (3) an authorization plug-in 112. The user and user group map 108 includes a list that contains system-wide users and user groups in the network. The ACL policy 110 includes aggregated system-wide ACL policies in a standard format, such as ORDL, that describe ACL on devices, services and content in: a home network environment. The authorization plug-in 112 communicates with the authorization agent 102.

The authorization plug-in 112 includes: a map that maps system-wide user and users and user groups to device-specific users and user groups; a device-specific communication protocol that is used to communicate with a device; and a map that maps device-specific ACL policy to system-wide ACL policy in the ACL policies 114. For example, the system-wide user group of "parent" maps to device-specific user group of "administrator" on a PC windows device. An ACL example is that an ACL policy on a PC windows device describes an ACL policy of "user "guest" can only access files in c:/temp/" maps to system-wide policy of "user "guest" can only access guest directory in PC".

In addition, the controller module 104 includes an authentication directory 116 that allows a user to have single sign-on to the home network. The authentication directory 114 provides a system-wide user identifier such that it can be recognized by the authorization directory 106 as a user that belongs to a user group or multiple user groups. In this example, all devices are networked with network 118 in a home environment using different network protocols, such as IEEE 802.11x, Ethernet.

Figure 5:
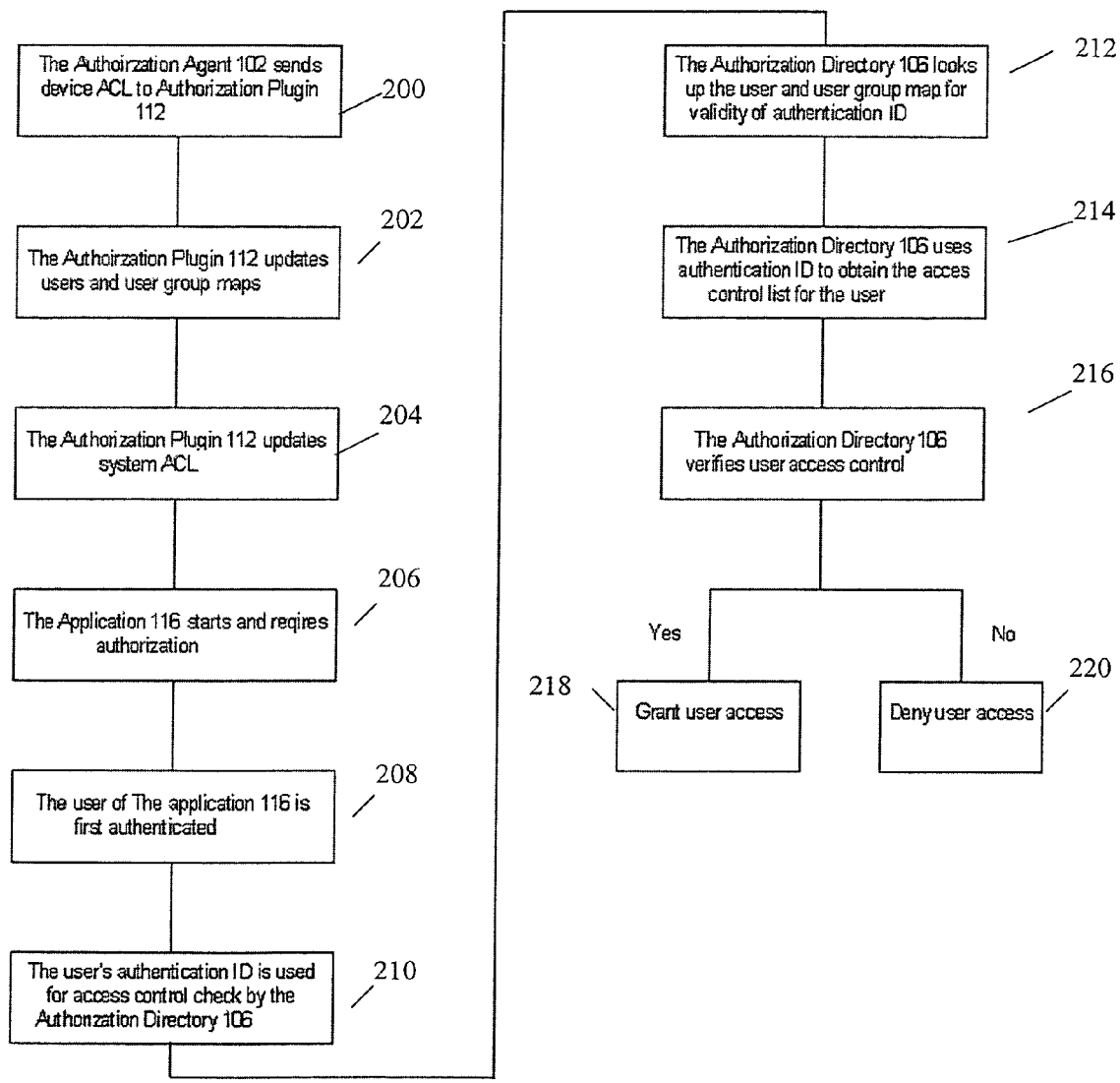
FIG. 5 shows an example flowchart of example access control steps implemented in the system of FIG. 2.

An example step-by-step description of single view authorization in the system of FIG. 2 is described below in conjunction with steps 200-210 shown in FIG. 5.

Step 200: Device 100 goes online in the home network. The authentication agent 102 sends the device-specific ACL to the authorization Plug-in 112 in the controller 104. The content of device-specific ACL can be an entire ACL that exists in the authorization agent 102, or it can be a partial device-specific ACL that updates the existing ACL in the ACL policy 110 and user and user group map 108. The updates can be performed using a device-specific synchronization protocol (e.g., SyncML can be used for synchronization).

Step 202: The authorization plug-in 112 updates the system-wide users and user groups map 108 therein, such that when an application (e.g., application 116) used by a system-wide user or user group wants to access resources on a device (e.g., device 100), the system-wide user or user group is mapped into a device-specific user and user group via the authorization plug-in 112.

Step 204: The authorization plug-in 112 updates the ACL policy 110. The update can be an entire ACL policy on the device 100 when the device 100 is being plugged into the home network for the first time. The update can also be a partial ACL when an ACL is modified when the device 100 is offline. At this point, the device 100 is online and is ready to be used.

Step 206: An application 116 is started by a user and the application needs to access a specific resource/content of the device 100.

Step 208: The user is first authenticated by the authentication directory 114. An example authentication method can be found in copending Application for "Method and System for Single Sign-on in a Network", U.S. Publication No. 2006/0185004, incorporated herein by reference.

Step 210: After authentication, the authentication directory 114 obtains a system-wide user ID and passes it to the authorization directory 106 for verification on the access control rights on the device 100.

Step 212: The authorization directory 106 consults with the user and user group map 108 for any user groups that the user belongs to.

Step 214: The authorization directory 106 then obtains an ACL from the ACL policy for access control rights that belongs to the user and the user groups on device 100.

Step 216: The authorization directory 106 verifies if the user is permitted to access the specific resource in the request. Alternatively, the authorization directory 106 can send the request to the authorization agent 102 via the authorization plug-in 112 for verification.

Step 218: If the request is granted, the application can access the specific resource/content on device 100 directly.

Step 220: Otherwise, the requested access is denied.

In another embodiment, the present invention provides a single view ACL revocation method among multiple devices. Some of the devices can comprise UPnP security-aware devices, while other devices may not comprise UPnP devices, but use different access protocols and have security system built into the devices (e.g., a PC with Windows operating system and DCOM access protocol).

Figure 3:
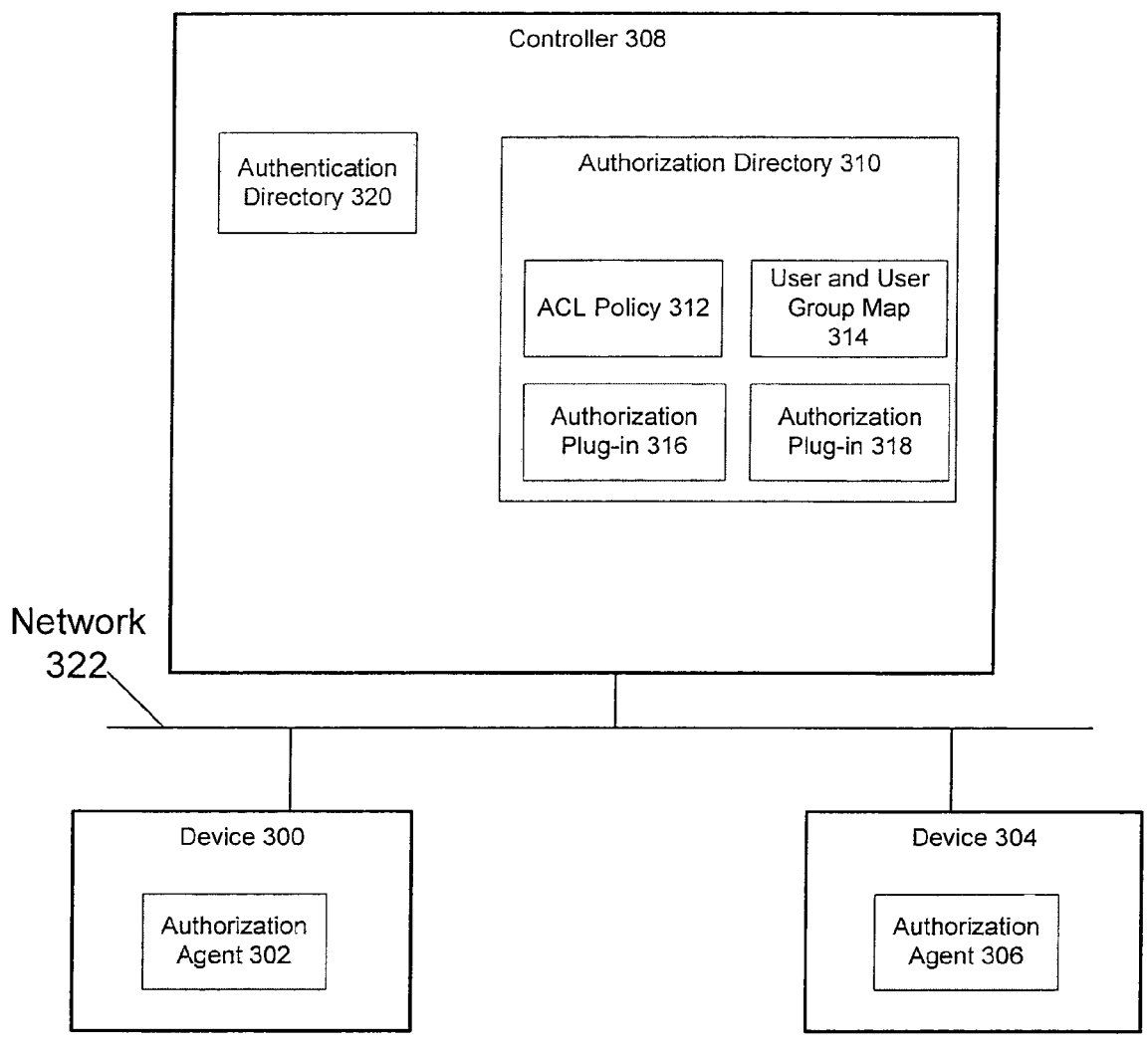
FIG. 3 shows an example functional block diagram of an access control system according to another embodiment of the present invention.

In one example, the ACL revocation method is implemented in an example system 290 in the home network, shown by a functional block diagram in FIG. 3, comprising: (1) a device 300 that is UPnP security-aware and includes an authorization agent 302, (2) a device 304 that is not a UPnP device and includes an authorization agent 306, and (3) a controller (software) module 308. The authorization agents 302 and 306 can be software modules that manage device-specific access protocol and device-specific ACL policy. An example UPnP security-aware device authorization agent 302 includes a list of UPnP ACL policies that specify who can access services on device with constraints. An example PC authorization agent 306 includes a list of ACL policies that specify the ownership of the content, the read and write operations on the content with PC-specific users and user groups.

The controller module 308 runs on a processing device, such as an UPnP control point with security console in the home network that allows users to manipulate ACL on other devices, and includes an authorization directory 310. The authorization directory 310 includes four (software) modules: a user and user group map 312; an ACL policy 314; and two authorization plug-ins 316 and 318, each of which communicates with authorization agents 302 and 306 on devices 300 and 304, respectively. The user and user group map 312 includes a list that contains aggregated system-wide users and user groups. The ACL policy 314 includes aggregated system-wide ACL policies in a standard format, such as ORDL that describes ACL on devices, services and content in a home network environment. The authorization plug-ins 316 and 318 can comprise software modules that communicate with authorization agents 302 and 306, respectively. Each of the authorization plug-ins 316, 318 includes: a map that maps system-wide user and users and user groups to device specific users and user groups; device-specific communication protocol that is used to communicate with a device; and a map that maps device-specific ACL policy to system-wide ACL policy in the ACL policy 314. For example, the system-wide user group of "parent" maps to device-specific user group of "administrator" on a PC windows device. An ACL example is that an ACL policy on a PC windows device describes an ACL policy of "user "guest" can only access files in c:/temp/" maps to system-wide policy of "user "guest" can only access guest directory in PC".

In addition, the controller module 310 includes an authentication directory 320 that allows a user to have single sign-on to the home environment. The authentication directory 320 provides a system-wide user identifier such that it can be recognized by the authorization directory 310 as a user that belongs to a user group or multiple user groups. In this example, all devices are networked with network 322 in a home environment using different network protocols, such as IEEE 802.11x, Ethernet.

Figure 6:
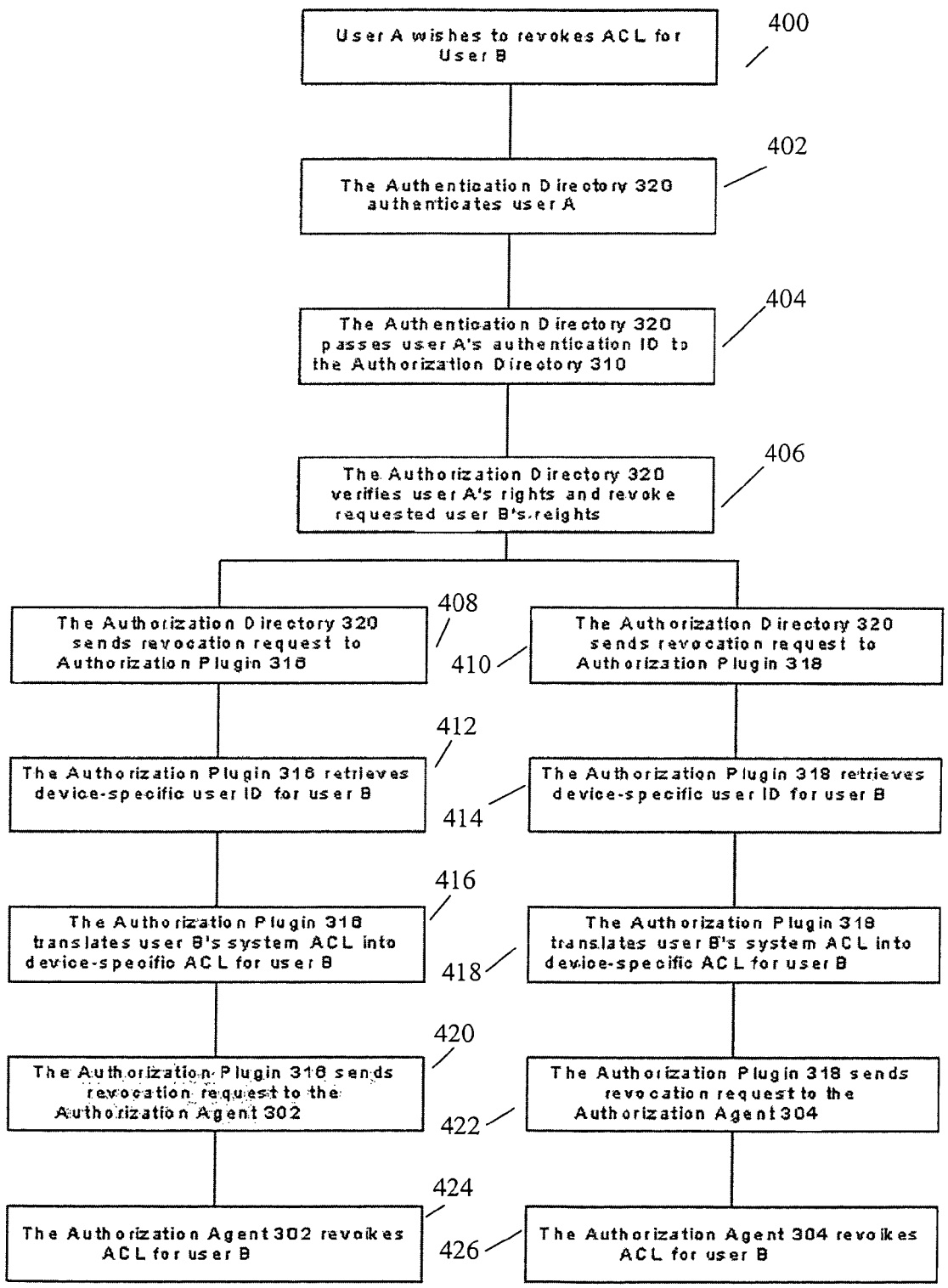
FIG. 6 shows an example flowchart of example access control steps implemented in the system of FIG. 3.

An example step-by-step description of revocation method in the example system 290 of FIG. 3 is described in conjunction with the steps 400-426 shown in FIG. 6.

Step 400: A user A wishes to revoke certain access rights on another user B.

Step 402: The authentication directory 320 authenticates the user A in 402. The detailed authentication method can be found in copending Application for "Method and System for Single Sign-on in a Network", U.S. Publication No. 2006/0185004, incorporated herein by reference.

Step 404: The authentication directory 320 passes the user A's system-wide ID to the authorization directory 310.

Step 406: The authorization directory 310 verifies that user A has permission to for the requested operation and revokes ACL in the ACL policy 312 for user B.

Step 408: The authorization directory sends the revocation request to the authorization plug-in 316 to revoke the ACL on device 300.

Step 410: In meantime, the authorization directory sends the same revocation request to the authorization plug-in 318 to revoke the ACL on device 304.

Step 412: The authorization plug-in 316 obtains device 300-specific user ID for user B from the user and user group map 314.

Step 414: The authorization plug-in 318 obtains device 304-specific user ID for user B from the user and user group map 314.

Step 416: The authorization plug-in 316 translates the system-wide ACL to device 300-specific ACL for user B.

Step 418: The authorization plug-in 318 translates the system-wide ACL to device 304-specific ACL for user B.

Step 420: The authorization plug-in 316 sends the revocation request to the authorization agent 302 with device-specific ACL and device-specific user ID for user B.

Step 422: The authorization plug-in 318 sends the revocation request to the authorization agent 304 with device-specific ACL and device-specific user ID for user B.

Step 424: The authorization agent 302 revokes ACL for user B on device 300.

Step 426: The authorization agent 306 revokes ACL for user B on device 304.

In another embodiment, the present invention provides a method for single view assigning ACL on devices (SSO method), which do not have built-in security measurement (i.e., there is authorization agent on the device). In one example, such a method is implemented in a system 490 shown by a function block diagram in FIG. 4, comprising: a device 500 that is UPnP device (not security-aware), and a controller module 504. The device 500 does not include security measurement, and as a result, it allows any control point access for any user. The controller 504 runs on a processing device, such as an UPnP control point with security console, and includes an authorization directory 506. The authorization directory 506 includes three (software) modules: (1) user and user group maps 508, (2) an ACL policy 510, and (3) an authorization plug-in 512. The user and user group map 508 includes a map that lists system-wide users and user groups. The ACL policy 510 includes system-wide ACL policies in a standard format, such as ORDL that describe ACL on devices, services and content in a home environment. The authorization plug-in 512 can be a software module which includes a security mechanism on behalf of device 500. The authorization plug-in 512 includes: (1) a list of user and user groups that allows to access resources on device 500, (2) an ACL for device 500, (3) a map that maps system-wide user and users and user groups to device-specific users and user groups, and (4) a map that maps system-wide ACL policy to device-specific ACL policies on individual device in the ACL policy 514. For example, the system-wide user group of "parent" maps to device-specific user group of "owner" on a UPnP device. An ACL example is that an ACL policy on a UPnP device describes an ACL policy of "user "guest" cannot access "control setting"" maps to system-wide policy of "user "guest" cannot access control setting on the UPnP device".

In addition, the controller module 504 includes an authentication directory 516 that allows a user to have single sign-on to the home environment. The authentication directory 514 provides a system-wide user identifier such that it can be recognized by the authorization directory 506 as a user that belongs to a user group or multiple user groups. In this example, all devices are networked with network 516 in a home environment using different network protocols, such as IEEE 802.11x, Ethernet.

Figure 4:
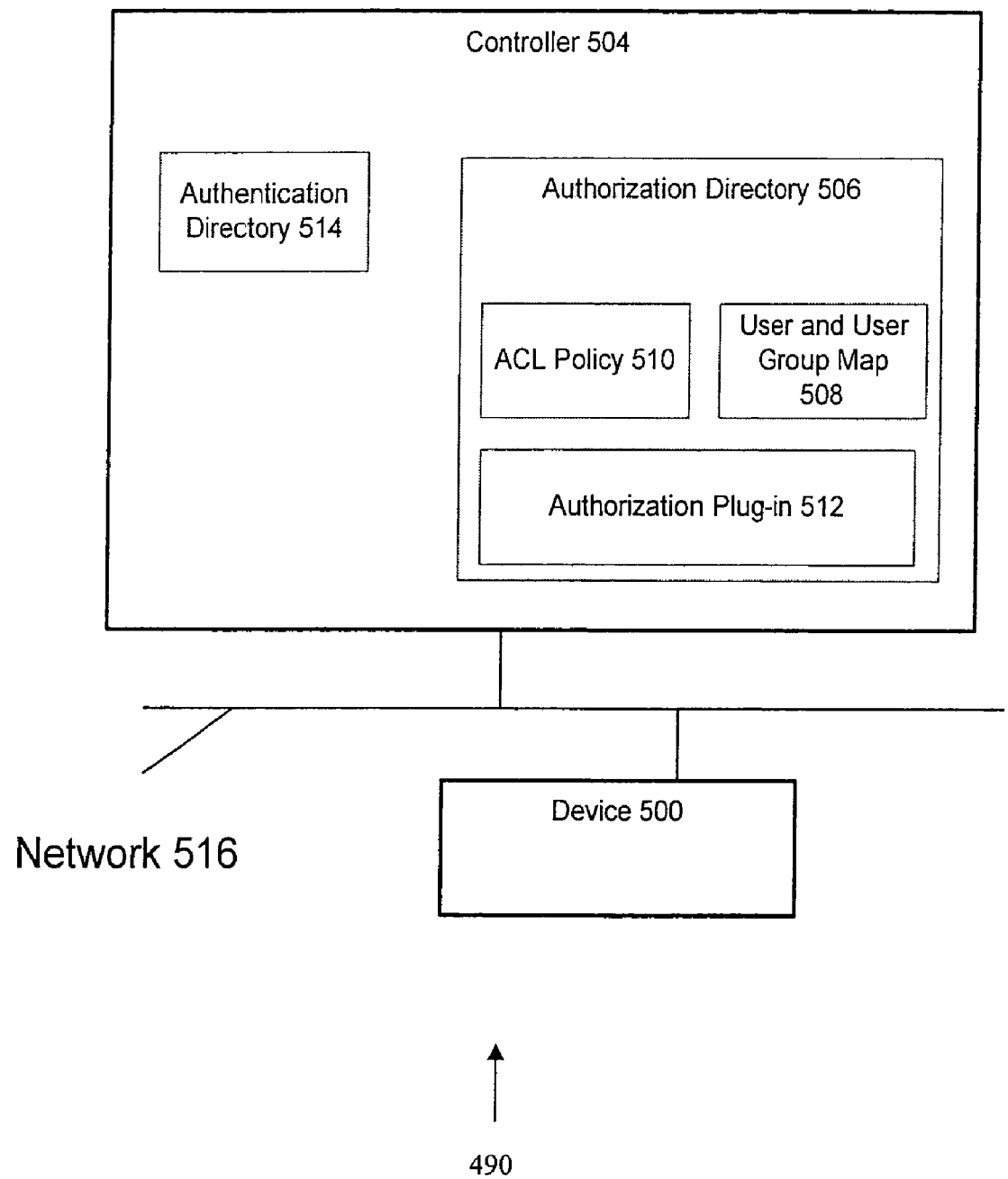
FIG. 4 shows an example functional block diagram of an access control system according to another embodiment of the present invention.
Figure 7:
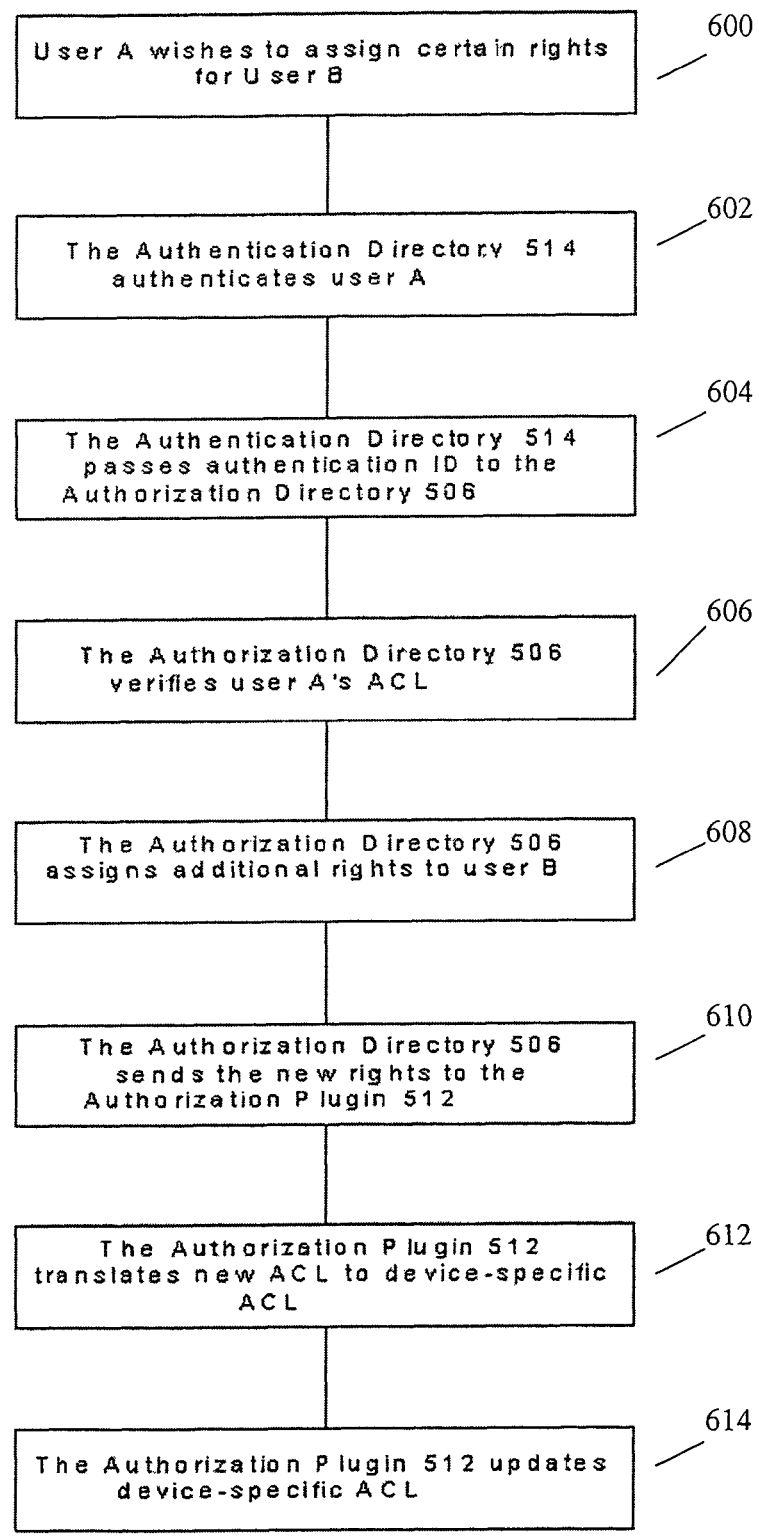
FIG. 7 shows an example flowchart of example access control steps implemented in the system of FIG. 4.

An example step-by-step description of the SSO method in the system of FIG. 4 is described in conjunction with the steps 600-614 shown in FIG. 7.

Step 600: A user A wishes to assign certain access control rights to a user B.

Step 602: The authentication directory 514 authenticates user A in 602. The detailed authentication method can be found in copending Application for "Method and System for Single Sign-on in a Network", U.S. Publication No. 2006/0185004, incorporated herein by reference.

Step 604: The authentication directory 514 passes user A's system-wide user ID to the authorization directory 506.

Step 606: The authorization directory 506 consults the ACL policy 510 for permission of user A to assign access control rights to the user B.

Step 608: Once the authorization directory 506 verifies that the user A has the permission, the authorization directory 506 assigns the requested rights to the user B in the ACL policy 510.

Step 610: The authorization directory 506 sends the newly assigned system-wide ACL to the authorization plug-in 512.

Step 612: The authorization plug-in 512 translates the system-wide ACL to device 500-specific ACL.

Step 614: The authorization plug-in 512 updates its internal device 500-specific ACL.

As those skilled in the art will recognize, the present invention is not limited to the above example embodiments. For example, in one alternative embodiment, the authorization directory is distributed over multiple controller modules. Each controller module runs on a separate device. For example, there may be multiple UPnP control points with security consoles. Each UPnP control point includes a portion of the authorization directory. Each portion of authorization directory can be either disjoint or overlapped in its content. In the case of disjoint authorization directories, the distributed authorization directories form a complete virtual authorization directory. The distributed controllers coordinate and synchronize such multiple directories to ensure that they are consistent for the user. In the case of overlapped authorization directories, the distributed controllers coordinate among themselves such that the multiple authorization directories form a complete and consistent virtual authorization directory. If an entry in the virtual directory changes, all entries in distributed authorization directories that correspond to the entry are updated. As those skilled in the art will recognize, there are various mechanisms that can be used for consistency update. One example method can be that of master/slave where one copy of a overlapped authorization directory is designated as a master, on which the update is always first performed, and other overlapped portions of distributed directory are designated as slaves to which the master propagates the updates.

In another alternative embodiment of the present invention, system includes multiple replications of the authorization directory. Each copy of the authorization directory is included in a separate controller that runs on a separate apparatus. The replications coordinate among themselves to keep a consistent view on the authorization directory. Various mechanisms can be employed to keep consistency. One example method is a master/slave technique where a master copy of the authorization directory is always first updated, and any changes are subsequently propagated to slave copies.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A system for managing user access control for a plurality of heterogeneous devices in a home network, the system comprising:

a plurality of heterogeneous devices each including a device-specific access control list policy, a security aware authorization agent, an operating system specific access control list policy; wherein each device-specific access control list policy describes content ownership information and content accessibility information; and a processor and an associated memory storing computer program code which when executed implements a controller that performs the steps of:

aggregating device-specific access control list policies of the plurality of heterogeneous devices in the home network into a consistent unified network wide access control list policy;

mapping said unified network wide access control list policy to a device-specific access control list policy for device-specific users and user groups for each heterogeneous device including mapping said unified network wide access control list policy to the operating system (OS)-specific access control list policy for device-specific users and user groups for each device;

managing the plurality of heterogeneous devices using the unified network wide access control list policy in each device;

controlling access to each heterogeneous device using the unified network wide access control list policy by checking for user authorization to access a selected device using the unified network wide access control list policy for authenticating a user over heterogeneous devices in the home network, without utilizing a centralized server for the home network;

accepting changes to the unified network wide access control list policy in the home network; and propagating the changes to the unified network wide access control list policy to each heterogeneous device that is affected by the changes in the unified network wide access control list policy; and storing the changes to the unified network wide access control list policy in a distributed manner on each device;

wherein propagating the changes to the unified network wide access control list policy to each heterogeneous device using a device-specific synchronization protocol.

2. The system of claim 1 wherein the controller further controls access to each device using the unified network wide access control list policy by checking for user authorization to access a selected device using the unified network wide access control list policy for authenticating a user over heterogeneous devices in the home network.

3. The system of claim 1 wherein the controller unifies the different access control list policies on the devices by further by allowing each device to have device-specific users, user groups, and associated access control list policies.

4. The system of claim 3 wherein the controller further unifies the diversity of different access controls on the devices by further by aggregating user information and user access control information from the devices.

5. The system of claim 4 wherein the controller further aggregates said information from each device as the device is connected to the home network.

6. The system of claim 4 wherein the controller further aggregates said information from each device as the device becomes available in the home network.

7. The system of claim 4 wherein the controller further updates said aggregated information from each device as the device becomes available in the home network.

8. The system of claim 1 wherein the controller controls access to a device by checking for user authorization to access a selected device using the single network wide access control list policy.

9. The system of claim 1 further comprising:
a device without built-in security measurement;
wherein the controller is further configured for controlling access to the device, the controller comprising an authentication directory and an authorization directory, wherein the authentication directory is configured for authenticating a user and the authorization directory is configured for authorizing user access to the device.

10. The system of claim 1, wherein at least one of the devices includes an operating system (OS) specific access control list policy.

11. A method for managing user access control for a plurality of heterogeneous devices in a network, comprising:
aggregating device-specific access control list policies of the plurality of heterogeneous devices in a home network into a consistent unified network wide access control list policy, wherein each heterogeneous device includes a security aware authorization agent, a device-specific access control list policy, and an operating system specific access control list policy, wherein the device-specific access control list policy describes content ownership information and content accessibility information;
mapping said unified network wide access control list policy to a device-specific access control list policy for device-specific users and user groups for each heterogeneous device including mapping said unified network wide access control list policy to the operating system (OS)-specific access control list policy for device-specific users and user groups for each device;
managing the plurality of heterogeneous devices using the unified network wide access control list policy in each device;
controlling access to each heterogeneous device using the unified network wide access control list policy by checking for user authorization to access a selected device using the unified network wide access control list policy for authenticating a user over heterogeneous devices in the home network, without utilizing a centralized server for the home network;
accepting changes to the unified network wide access control list policy in the home network; and
propagating the changes to the unified network wide access control list policy to each heterogeneous device that is affected by the changes in the unified network wide access control list policy; and storing the changes to the unified network wide access control list policy in a distributed manner on each device;
wherein propagating the changes to the unified network wide access control list policy to each heterogeneous device using a device-specific synchronization protocol.

12. The method of claim 11 wherein aggregating further comprises allowing each device to have device-specific users, user groups, and associated access control list policies.

13. The method of claim 11 further comprising including said aggregated information in each of said devices.

14. The method of claim 11 wherein aggregating further includes aggregating user information and user access control information from each device as the device is connected to the home network.

15. The method of claim 11 wherein aggregating further includes aggregating user information and user access control information from each device as the device becomes available in the home network.

16. The method of claim 11 wherein aggregating further includes updating user information and user access control information from each device as the device becomes available in the home network.

17. The method of claim 11 further comprising controlling access to each device using the unified network wide access control list policies.

18. The method of claim 17 wherein controlling access further includes checking for user authorization to access a selected device using the unified network wide access control list policies for authenticating a user over heterogeneous devices in the home network.

19. The method of claim 11 wherein the unified network wide access control list policies mapped to each heterogeneous device includes information of device specific users, user groups and associated access control list policies for each device in the home network.

20. The method of claim 11 further including annotating each device with access control policy information for each user, and allowing user access to a device by verifying the associated access control policy information.

21. The method of claim 11, wherein the device-specific access control list policy includes digital rights management (DRM) information that controls how the content can be accessed and manipulated using Open Digital Rights Language (ODRL).

22. The method of claim 11 further comprising:
receiving a request for access to a specific device by a user;
checking for authentication of the user by the specific device; and
checking for authorization of the user by the specific device.

23. The method of claim 22 further comprising:
if the user is authenticated by the specific device and if the user is authorized by the specific device, providing the user access to the specific device.

* * * * *